May 3, 1949. R. A. GULICK Re. 23,106

DOUBLE WALL VESSEL

Original Filed July 3, 1943

Inventor
Russell A. Gulick
by Pollitz, Cushman & Woodbury
Att'ys.

Reissued May 3, 1949

Re. 23,106

UNITED STATES PATENT OFFICE 23,106

DOUBLE WALL VESSEL

Russell A. Gulick, Lynnfield, Mass., assignor, by mesne assignments, to Stator Corporation, a corporation of Rhode Island Original No. 2,448,589, dated September 7, 1948, Serial No. 493,371, July 3, 1943. Application for reissue February 24, 1949, Serial No. 78,121

5 Claims. (Cl. 215—13)

This invention relates to the manufacture of double wall vessels of the type having nested inner and outer containers secured together by a band of cementitious material at or adjacent to their upper ends, which effectively seals the space therebetween. Vessels of this type are useful as containers for various items, particularly food and liquids, for example, tumblers for holding hot and cooled beverages, cocktail shakers, ice pails, butter dishes, "Thermos" bottles, etc.

A difficulty encountered in the manufacture of colored vessels of the above type is attributable to the failure of the cementitious material to adhere to the colored surfaces with the degree of tenacity which will withstand varying conditions encountered in ordinary use. If it be attempted to cement to a part of the container which has been colored, as by the application of a surface coating such as paint, lacquer, etc., the cementitious bond is apt either to strip the color coat from the surface to which it has been applied or break away from it, when subjected to one or another of the conditions encountered in using the vessel, thus breaking the seal and rendering the vessel unfit for further use; and, on the other hand, if it be attempted to "fire-color" the entire container, such treatment is not only expensive, but often renders the glass so brittle, or otherwise impairs its strength, as to preclude its use in vessels of the above type.

The principal objects of the present invention are to overcome the aforementioned difficulties and to provide a vessel of the aforesaid type which is of attractive appearance and which can be made readily and economically. Another object is to provide a double wall vessel having inner and outer containers sealed together and one or both of which is provided with colored parts, and a method of making the same, which vessel is not only capable of standing ordinary usage but also of being subjected to quick changes in temperature without impairing the seal.

Further objects will be apparent from a consideration of the following description and the accompanying drawings, wherein.

Figure 1:
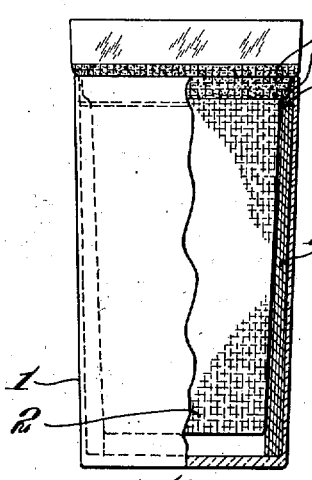
Fig. 1 is an elevation, with parts broken away and shown in section, of a double wall vessel made in accordance with the present invention.
Figure 2:
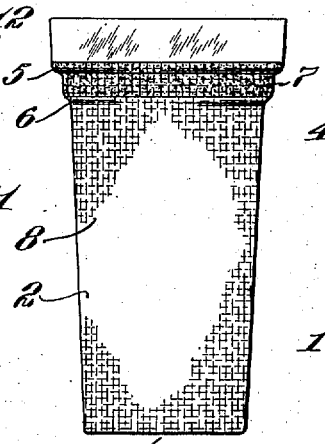
Figs. 2 and 3 are elevational views of the colored inner and outer containers, respectively.
Figure 3:
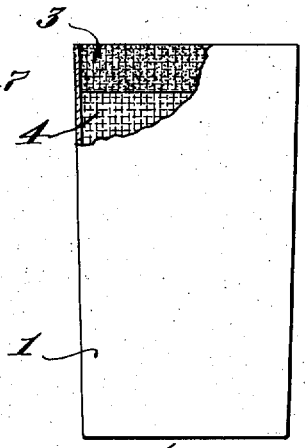
Figure 4:
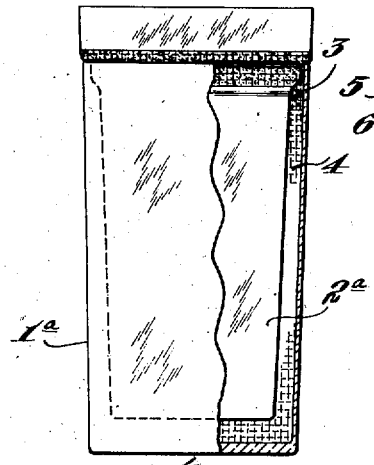
Figure 5:
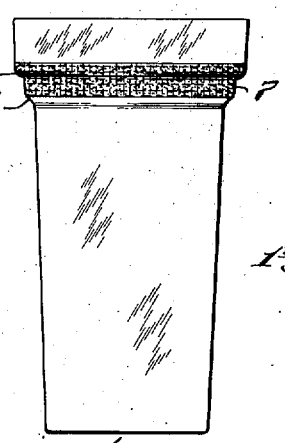
Figure 6:
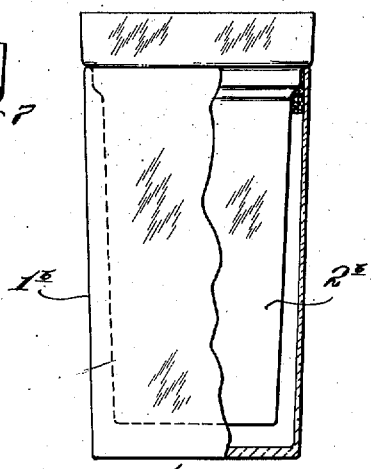
Figure 7:
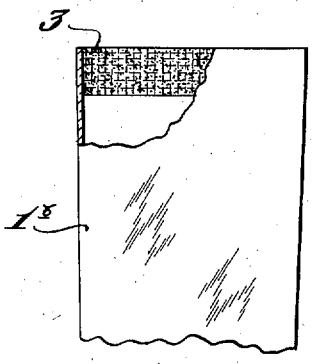

Figs. 4 and 5 are views corresponding to Figs. 1 and 2, respectively, but showing another modification; and Figs. 6 and 7 are views corresponding to Figs. 1 and 3, respectively, showing a further modification.

In accordance with the present invention a double wall vessel of the aforementioned type is made from two containers of generally similar shape, which are telescoped together so as to provide a relatively narrow sealing space between their upper end portions and a wider space between their body and lower end portions. The containers may be of ceramic material, such as glass, which may be transparent or translucent, and the inner surface of the outer container and/or the outer surface of the inner container may be fire-colored preferably only at the zones defining the narrow sealing space. The remaining areas of the surfaces may remain uncolored or they may be colored by a coating of suitable coloring material, as hereinafter more fully described.

The fire-coloring may be effected in the usual way. As described in Encyclopedia Britannica, fourteenth edition, volume 18, page 355[b], the article is "painted with dyes, with which a very light fusible glass-powder has been mixed. In order to make these melt together with the glazing and become durable the painted objects are heated in an enamel-furnace to a heat of 700°–800°." More detailed descriptions of fire-coloring are to be found in Modern Glass Practice, by Samuel R. Scholes, published by Industrial Publications, Inc., Chicago, 1941, chapter XVII, Decorative Processes, Fired Decorations, pages 202–204; and Glass Manufacture, by Walter Rosenhain, published by D. Van Nostrand Co., New York, 1919, Chapter XII, Colored Glasses, pages 193 to 194; and Glass and Glassware, by Lehmann and Kennard, Merchandise Manual Series, Differences in Glass, page 46.

The two containers are permanently sealed together by a suitable cementitious material, such as a silicate cement, or any other sealing material which will not only withstand high and low temperatures, but which is also waterproof and capable of resisting various substances of an acid and alkali character, water, alcohol, oily and greasy materials, etc.

Referring to Figs. 1 to 3, the embodiment shown therein comprises a pair of nested ceramic containers 1 and 2, the outer container 1 having a fire-colored band 3 (Fig. 3) on the inner surface at its mouth portion and a coating 4 of colored paint or lacquer applied to its inner surface below the fire-colored band 3. The inner container 2 is formed with an enlarged upper end which defines a pair of spaced annular shoulders 5 and 6, the shoulder 5 being shaped so as to seat on the upper edge of the outer container 1 to form a sealing space between the two shoulders when the containers are nested, as shown in Fig. 1. The zone or band 7, defined by the shoulders 5 and 6, may be fire-colored on its exterior surface, and the remaining exterior surface below the shoulder 6 may be colored by a coating 8 of paint, lacquer or the like; alternatively the entire or any part of the inner surface of the outer container or the outer surface of the inner container may be colored by a coating of colored cement of suitable consistency.

A band of cement 10 interposed between the two fire-colored zones or bands 3 and 7, effectively seals the two containers. Prior to the application of the cement 10, several convolutions of insulating sheets 11 and an insulating ring 12 may be applied about the inside of the outer container 1, this insulation being effective to resist transfer of heat to and from the inner container 2. The manner of sealing the containers is preferably as disclosed in application Serial No. 430,301, filed February 10, 1942, now Patent No. 2,368,273, dated January 30, 1945, although different procedures may be employed.

It will be noted that in case fire-coloring is used, the application of the cementitious seal is substantially confined to the area or zone which has been fire-colored, and that the fire-colored zone of each tumbler is bounded by or adjacent to the larger zones of coated surfaces which have not undergone embrittlement or other impairment such as may result from fire-coloring. Hence, the cementitious band 10 not only effectively joins the inner and outer containers together, but also provides, in effect, a reinforcement for the embrittled fire-colored zones 3 and 7 and cooperates with the coated areas 4 and 8 in compensating for the weakness attributable to the fire-colored zones.

The physical structure of the embodiments shown in Figs. 4 to 7 is substantially the same as that of the foregoing embodiment, and the same or similar reference characters are applied to corresponding parts. In the embodiments shown in Figs. 4 and 5, the outer container $1^a$ is identical to that of the embodiment shown in Figs. 1 to 3, having a fire-colored band 3 at its upper end portion and a coating 4 of colored lacquer or paint on its interior surface, but the inner container $2^a$ is transparent except for the fire-colored band 7 between the shoulders 5 and 6. The advantage of this arrangement is that due to the transparency of the inner container, total reflection is attained and a clear liquid within the inner container exhibits a more desirable appearance.

In the embodiments shown in Figs. 6 and 7, both the outer and inner containers $1^b$ and $2^b$, respectively, are transparent except for the fire-colored band 3 on the interior surface of the outer container which, as in the above-described embodiments, not only provides a surface to which the cementitious seal firmly adheres, but also effectively conceals the band of cementitious material, thus enhancing the appearance of the article.

While I have shown and described different desirable embodiments of the invention, it is to be understood that this disclosure is for the purpose of illustration, and that various changes in shape, proportion and arrangement of parts, as well as the substitution of equivalent elements for those herein shown and described, may be made without departing from the spirit and scope of the present invention as set forth in the appended claims.

I claim:

1. A double wall vessel comprising inner and outer containers of ceramic material having upper ends and lower body portions, said upper ends having inner and outer opposing surfaces with a narrow space therebetween and said body portions having opposing surfaces with a wider space therebetween, said inner surface of the upper end of the outer container being fire-colored throughout only a relatively narrow annular zone and said inner surface of the body portion of the outer container being colored by a surface coating, and a band of cementitious material bridging said narrow space in said annular zone.

2. In the manufacture of double wall vessels of the type having nested inner and outer containers of ceramic material which comprise upper ends and lower body portions, the upper ends having inner and outer opposing surfaces with a narrow space therebetween and the lower body portions also having inner and outer opposing surfaces with a space therebetween, the method which comprises fire-coloring said inner surface of the upper end of the outer container throughout only a relatively narrow zone, coloring said inner surface of the body portion of the outer container by the application of a fluid coating material, and applying a band of cementitious material in said narrow space within said narrow zone to seal the space and bond the containers together.

3. A double-wall vessel comprising inner and outer containers of ceramic material having upper ends and lower body portions, said upper ends having inner and outer opposing surfaces with a narrow space therebetween and said body portions having opposing surfaces with a wider space therebetween, the inner opposing surface at the upper end of the outer container being fire-colored throughout only a relatively narrow annular zone and the outer opposing surface at the upper end of the inner container being fire-colored throughout an area corresponding with the fire-colored zone of said outer container, and a band of cementitious material interposed between and confined within the bounds of the fire-colored zones so as to be substantially concealed thereby, said cementitious material sealing said narrow space and bonding said containers together.

4. In the manufacture of double-wall vessels of the type having nested inner and outer containers of ceramic material which comprises narrow upper end portions and wide lower body portions, the upper end portions having inner and outer opposing surfaces with a narrow space therebetween and the lower body portions also having inner and outer opposing surfaces with a space therebetween, the method which comprises fire-coloring a surface of the outer container throughout only the relatively narrow annular zone substantially coextensive with the width of its said narrow upper end portion, fire-coloring the outer surface of the inner container throughout at least the relatively narrow annular zone substantially coextensive with the width of its said narrow upper end portion and applying a band of cementitious material in said narrow space between said narrow upper end portions to seal the space and bond the containers together.

5. A double-wall vessel comprising inner and outer containers of ceramic material having narrow upper end portions and wide lower body portions, said upper end portions having inner and outer opposing surfaces with a narrow space therebetween and said body portions having opposing surfaces with a wider space therebetween, a surface of the upper part of the outer container being fire-colored throughout only the relatively narrow annular zone substantially coextensive with the width of its narrow upper end portion and the outer surface of the inner container being fire-colored throughout at least the relatively narrow annular zone corresponding with the fire-colored zone of said outer container, and a band of cementitious material interposed between and confined within the bounds of the inner and outer opposing surfaces of said narrow upper end portions so as to be substantially concealed by said fire-colored zones, said cementitious materials sealing said narrow space and bonding said containers together.

RUSSELL A. GULICK.

No references cited.